(12) United States Patent
Chen et al.

(10) Patent No.: US 8,687,061 B2
(45) Date of Patent: Apr. 1, 2014

(54) ENTRANCE GUARD DEVICE WITH LIGHT-UNIFORMIZATION STRUCTURE

(75) Inventors: Ren-Peng Chen, Taipei (TW); Ke-Rong Lin, Taipei (TW)

(73) Assignee: AmRoad Technology Inc. (TW)

( * ) Notice: Subject to any disclaimer, the term of this patent is extended or adjusted under 35 U.S.C. 154(b) by 326 days.

(21) Appl. No.: 13/343,077

(22) Filed: Jan. 4, 2012

(65) Prior Publication Data

US 2013/0169802 A1 Jul. 4, 2013

(51) Int. Cl.
*H04N 7/18* (2006.01)
(52) U.S. Cl.
USPC .......................................... 348/143; 382/118
(58) Field of Classification Search
CPC ........................................................ H04N 7/18
USPC .......................................... 386/143; 382/118
See application file for complete search history.

(56) References Cited

U.S. PATENT DOCUMENTS

2010/0039508 A1* 2/2010 Li ................................. 348/77
2012/0268237 A1* 10/2012 Lee et al. ...................... 340/5.7

* cited by examiner

*Primary Examiner* — Huy T Nguyen

(57) ABSTRACT

The present invention relates to an entrance guard device with light-uniformization structure, comprising: a housing, a main controlling module, a keypress module, a display module, a doorbell module, and an image capture module, wherein the image capture module consists of an image capture device accommodating body, a light-emitting assembly, an image capture device, a light-uniformization member, and a lens. In the present invention, the light-uniformization member is disposed at the front of a plurality of light-emitting chips of the light-emitting assembly, such that the light emitted by the light-emitting chips is able to enter the light-uniformization member, and then the light would be uniformly emitted by the light-uniformization member after the light are refracted; Therefore, the uniform light may shine on people face for making an image capture device of the image capture module capture the facial feature of people completely and clearly.

9 Claims, 5 Drawing Sheets

US 8,687,061 B2

ENTRANCE GUARD DEVICE WITH LIGHT-UNIFORMIZATION STRUCTURE

BACKGROUND OF THE INVENTION

1. Technical Field

The present invention relates to an entrance guard device, and more particularly, to an entrance guard device with light-uniformization structure.

2. Description of Related Art

Recently, with the rapid modernization of society, people make higher and higher demands on their living quality, and more particularly, on the comfort and the convenience of living environments thereof. So that, people upgrade the comfort and the convenience of their living environments by way of the advanced technologies, wherein the entrance guard machine is an example.

The initially developed entrance guard machine merely provides people to exchange their voice information, and then two people respectively stand inside and outside of the door can make conversation to each other through the entrance guard machine. After that, a video entrance guard machine is proposed, and then, through the video entrance guard machine, people can not only make conversation to each other, but also can see the images of the people in the conversation.

Please refer to FIG. 1, which illustrates a stereo view of a conventional video entrance guard machine. As shown in FIG. 1, the conventional video entrance guard machine 1' consists of a base 11' and a cover 12', wherein the base 11' accommodates a plurality of electronic chips, a plurality of electronic devices and a plurality of electronic circuit modules, and the cover 12' is assembled with the base 11' through a plurality of screws 18'. In addition, the electronic circuit modules includes camera module 13', camera auxiliary device 14', communication module 15', keypress module 16', and a state display device 17', wherein the camera auxiliary device 14' is commonly a light-emitting chip or the combination of the light-emitting chips, for example, an LED chip or an LED module. Therefore, when the luminance brightness of the environment is not adequate for making the camera module 13' capture the facial feature of a guest clearly, the camera auxiliary device 14' would emit an auxiliary light for helping the camera module 13' to capture the facial feature of the guest clearly and completely.

So that, through above descriptions, it is able to know the conventional video entrance guard machine 1' has many advantages consisting of simple structure and full function; however, the video entrance guard machine 1' still includes the drawbacks and the shortcomings as follows:

1. The auxiliary light emitted by the camera auxiliary device 14' is not a uniform light, wherein when the non-uniform light shines on the guest face, it may cause some shadows on the guest face or make some areas on the guest face more bright, such that the shadows and the bright areas on the guest face cause that the camera module 13' can not capture the facial feature of the guest clearly and completely.
2. Inheriting to above point 1, moreover, the non-uniform light emitted by the camera auxiliary device 14' is not a soft light, and the non-uniform light may cause a discomfort to the guest when the guest's eyes is close to the non-uniform light.

Accordingly, in view of the conventional video entrance guard machine still has shortcomings and drawbacks, the inventor of the present application has made great efforts to make inventive research thereon and eventually provided an entrance guard device with light-uniformization structure.

BRIEF SUMMARY OF THE INVENTION

The primary objective of the present invention is to provide an entrance guard device with light-uniformization structure, in which, a light-uniformization member is disposed in an image capture module and positioned at the front of a plurality of light-emitting chips, such that the light emitted by the light-emitting chips is able to enter the light-uniformization member, and then the light would be uniformly emitted by the light-uniformization member after the light are refracted; therefore, the uniform light shine on people face for making an image capture device of the image capture module capture the facial feature of people completely and clearly.

Accordingly, to achieve the primary objective of the present invention, the inventor proposes an entrance guard device with light-uniformization structure, comprising:

a housing, having an accommodating case and a cover;

a main controlling module, accommodated in the accommodating case;

a keypress module, accommodated in the accommodating case and exposed out of the cover, and the keypress module is electrically connected to the main controlling module;

a display module, accommodated in the accommodating case and exposed out of the cover, and the display module is electrically connected to the main controlling module;

a doorbell module, accommodated in the accommodating case and exposed out of the cover, and the doorbell module is electrically connected to the main controlling module; and an image capture module, accommodated in the accommodating case and exposed out of the cover, and the image capture module is electrically connected to the main controlling module, wherein the image capture module comprises:

an image capture device accommodating body, having a bottom portion and a protrusion portion, wherein the bottom portion has a plurality of light-emitting device openings, and the protrusion portion having an image capture device opening and a sensing device opening;

a light-emitting assembly, having a substrate, a plurality of light-emitting chips, a sensing device, and a light-emitting chip controller, wherein the substrate consists of a substrate aperture, and the light-emitting chips, the sensing device and the light-emitting chip controller are disposed on the substrate, moreover, the substrate is connected to the bottom portion of the image capture device accommodating body, such that the light-emitting chips respectively pass through the light-emitting device openings and the sensing device exposes out of the sensing device opening;

an image capture device, disposed into the protrusion portion of the image capture device accommodating body through the substrate aperture, and exposed out of the image capture device opening of the protrusion portion;

a light-uniformization member, disposed on the image capture device accommodating body via a first gasket, and having a main aperture, a light-emitting surface and a light refracting surface opposite to the light-emitting surface; and a lens, disposed over the main aperture for covering and protecting the image capture device;

wherein the sensing device is able to sense the luminance brightness of an external environment, therefore, when the sensing device senses and determines that the luminance brightness of the external environment is not adequate for making the image capture device capture the facial feature of people completely and clearly, the sensing device informs the light-emitting chip controller for controlling the light-emitting chips to emit light;

wherein when the light-emitting chips emit the light, the light would enter the light refracting surface of the light-uniformization member, and then the light is refracted by the light refracting surface, so as to be evenly emitted through the light-emitting surface of the light-uniformization member.

BRIEF DESCRIPTION OF THE SEVERAL VIEWS OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE INVENTION

To more clearly describe an entrance guard device with light-uniformization structure according to the present invention, embodiments of the present invention will be described in detail with reference to the attached drawings hereinafter.

Figure 1:
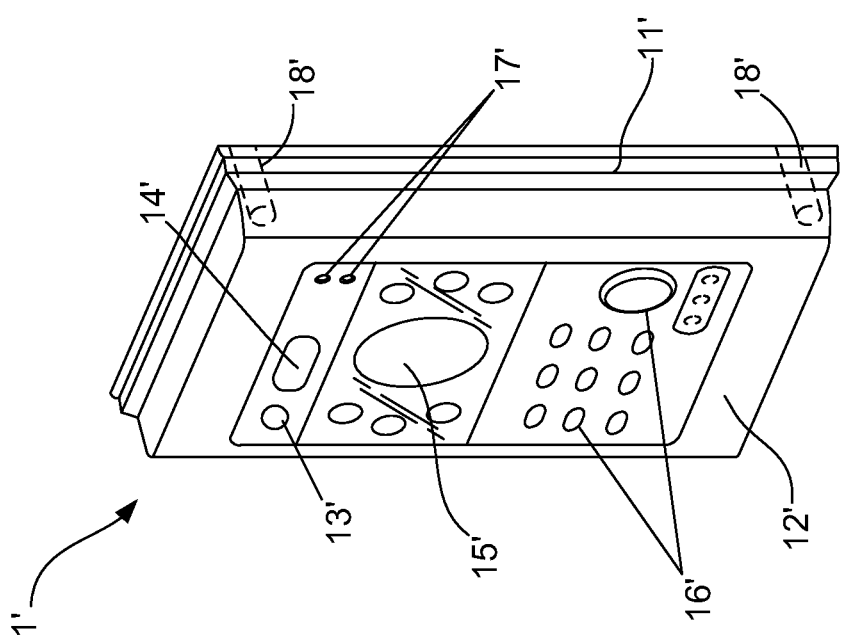
FIG. 1 is a stereo view of a conventional video entrance guard machine.
Figure 2:
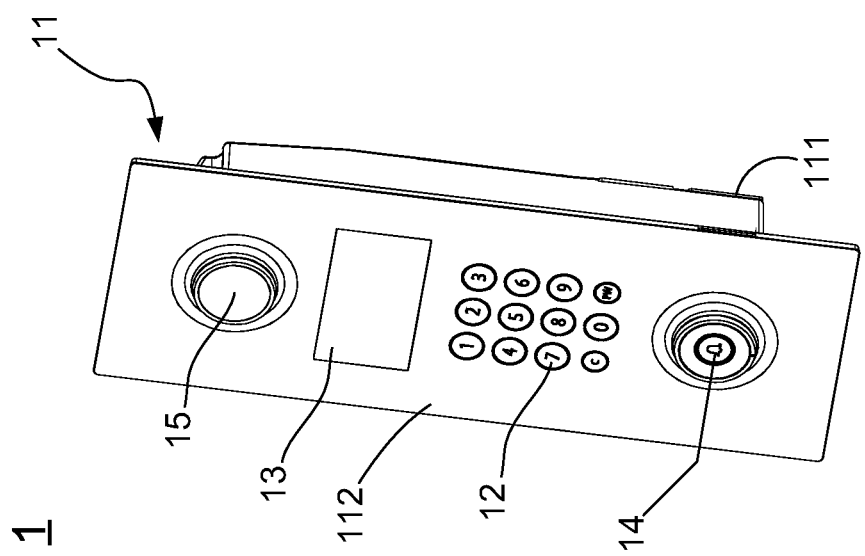
FIG. 2 is a stereo view of an entrance guard device with light-uniformization structure according to the present invention.

Please refer to FIG. 2, which illustrates a stereo view of an entrance guard device with light-uniformization structure according to the present invention. As shown in FIG. 2, the entrance guard device 1 with light-uniformization structure can be disposed in a pre-buried box for being an embedded entrance guard device and embedded into a pre-dredged cave of a wall. The entrance guard device 1 with light-uniformization structure includes: a housing 11, a main controlling module (not shown), a keypress module 12, a display module 13, a doorbell module 14, and an image capture module 15, wherein the housing 11 has an accommodating case 111 and a cover 112, and the main controlling module (not shown), the keypress module 12, the display module 13, the doorbell module 14, and the image capture module 15 are accommodated in the accommodating case 111. Besides, all the keypress module 12, the display module 13, the doorbell module 14, and the image capture module 15 are electrically connected to the main controlling module and exposed out of the cover 112.

Figure 3:
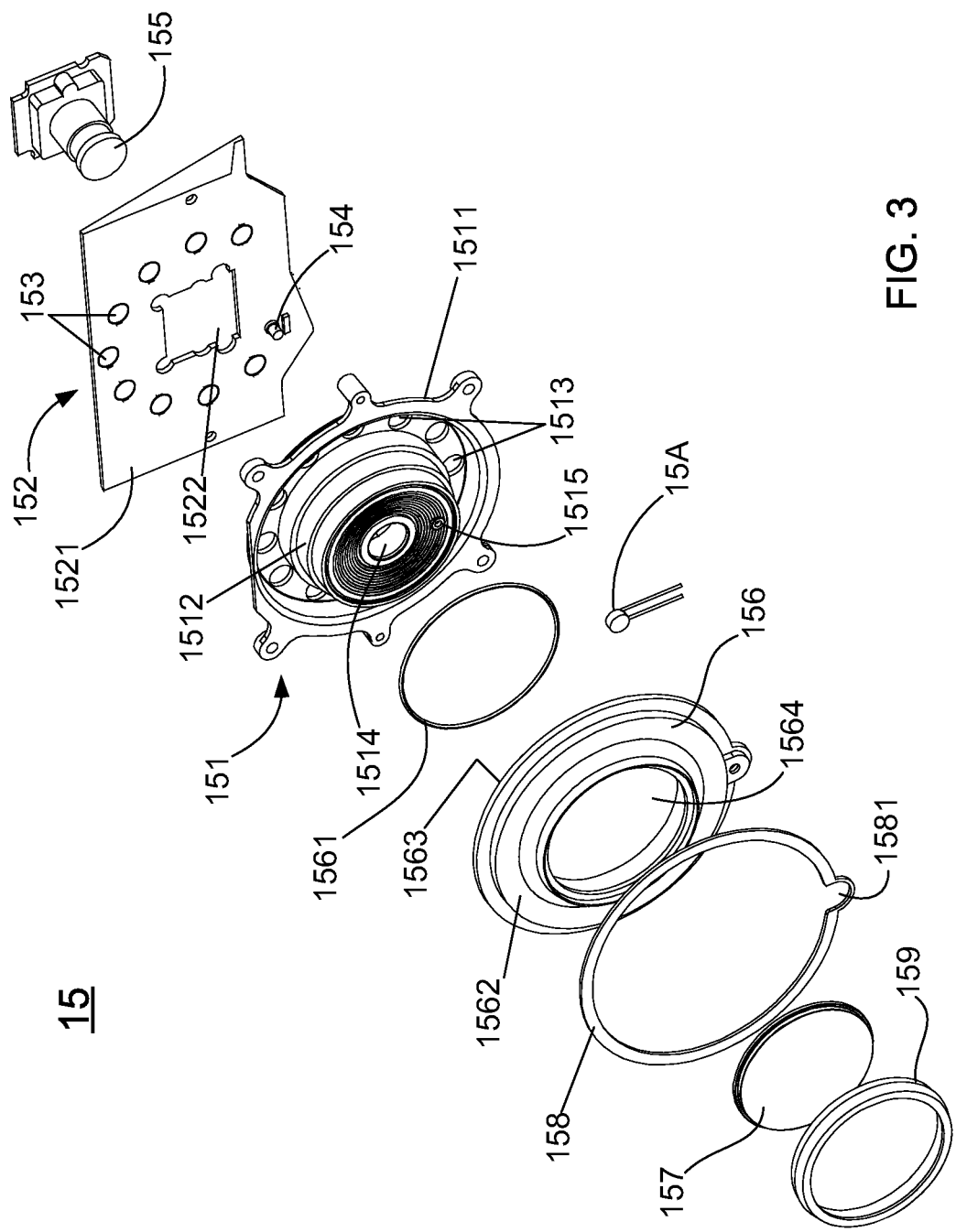
FIG. 3 is an exploded view of an image capture module of the entrance guard device with light-uniformization structure according to the present invention.

Referring to FIG. 2 again, and please simultaneously refer to FIG. 3, there is shown an exploded view of the image capture module. As shown in FIG. 3, the image capture module 15 includes: an image capture device accommodating body 151, a light-emitting assembly 152, an image capture device 155, a light-uniformization member 156, a lens 157, and a microphone 15A. The image capture device accommodating body 151 has a bottom portion 1511 and a protrusion portion 1512, wherein the bottom portion 1511 is coated with a layer of white paint and has a plurality of light-emitting device openings 1513. The protrusion portion 1512 has an image capture device opening 1514 and a sensing device opening 1515. The light-emitting assembly 152 has a substrate 1521, a plurality of light-emitting chips 153, a sensing device 154, and a light-emitting chip controller (not shown), wherein the substrate 1521 consists of a substrate aperture 1522, and the light-emitting chips 153, the sensing device 154 and the light-emitting chip controller are disposed on the substrate 1521.

In the entrance guard device 1 with light-uniformization structure of the present invention, the substrate 1521 is connected to and below the bottom portion 1511 of the image capture device accommodating body 151, such that the light-emitting chips 153 respectively pass through the light-emitting device openings 1513 and the sensing device 154 exposes out of the sensing device opening 1515. Moreover, it needs to note that, the light-emitting chip 153 can be an LED chip, an OLED chip or a bulb, and the manufacturer can selectively use the LED chip, the OLED chip or the bulb as the light-emitting chip 153.

Referring to FIG. 3 again, the image capture device 155 is disposed into the protrusion portion 1512 of the image capture device accommodating body 151 through the substrate aperture 1522, and the image capture device 155 exposes out of the image capture device opening 1514 of the protrusion portion 1512. The light-uniformization member 156 is disposed on the image capture device accommodating body 151 via a first gasket 1561 and has a main aperture 1564, a light-emitting surface 1562 and a light refracting surface 1563 opposite to the light-emitting surface 1562. The lens 157 is disposed over the main aperture 1564 for covering and protecting the image capture device 155.

Figure 4:
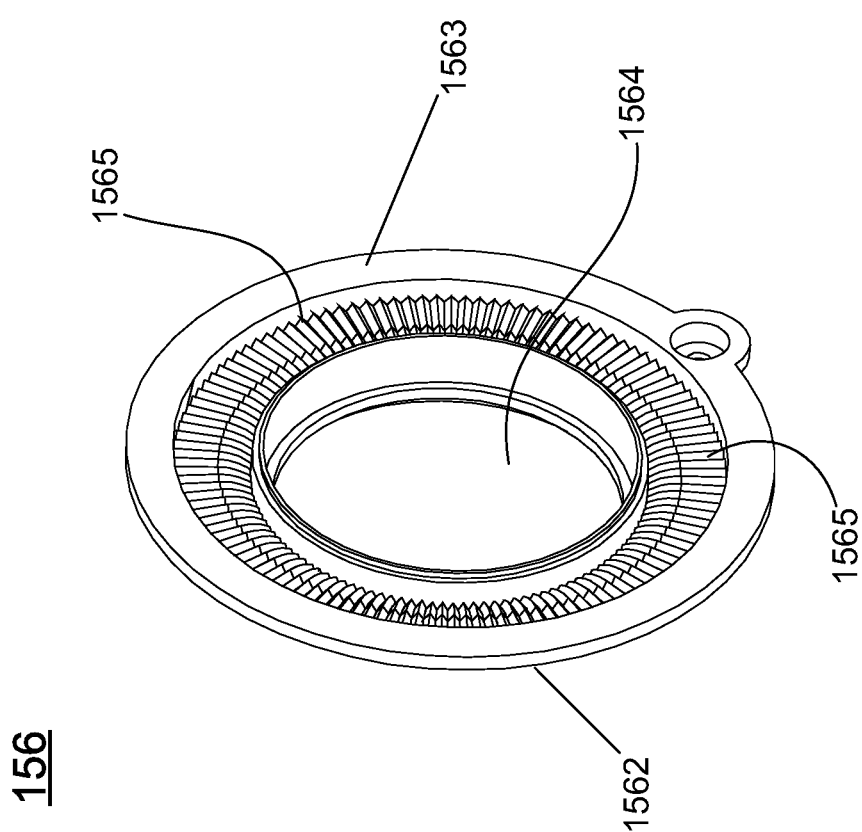
FIG. 4 is a stereo view of a light-uniformization member of the entrance guard device with light-uniformization structure according to the present invention.

Please refer to FIG. 4, which illustrates a stereo view of a light-uniformization member. As shown in FIG. 4, the light refracting surface 1563 of the light-uniformization member 156 formed with a plurality of light refracting portions 1565 for effectively refracting the light emitted by the light-emitting chips 153. The shape of the light refracting portion 1565 can be arc shape, trapezoid shape, square shape, triangle shape, or a combining shape by any two aforesaid shapes. In the entrance guard device 1 with light-uniformization structure of the present invention, the sensing device 154 is able to sense the luminance brightness of an external environment, therefore, when the sensing device 154 senses and determines that the luminance brightness of the external environment is not adequate for making the image capture device 155 capture the facial feature of people completely and clearly, the sensing device 154 would inform the light-emitting chip controller for controlling the light-emitting chips 153 to emit light. Moreover, when the light-emitting chips 153 emit the light, the light would enter the light refracting surface 1563 of the light-uniformization member 156, and then the light being refracted by the light refracting portions 1565 formed on the light refracting surface 1563, and then the light would be evenly emitted through the light-emitting surface 1562 of the light-uniformization member 156. So that, for the light is uniformly emitted through the light-emitting surface 1562, the uniform light can shine on the people face for completely revealing the facial feature of the people, such that the image capture device 155 is able to fully capture the facial feature of the people.

Moreover, the image capture module 15 of the entrance guard device 1 with light-uniformization structure further includes a second gasket 158, a lens ringer 159 and a microphone 15A. As shown in FIG. 3, the second gasket 158 is disposed on the light-emitting surface 1562 of the light-uniformization member 156 by way of surrounding the light-emitting surface 1562, and has a microphone receiving portion 1581. The lens ringer 159 is disposed on the lens 157 by way of surrounding the lens 157; in addition, the microphone 15A is disposed on the light-uniformization member 156.

Figure 5:
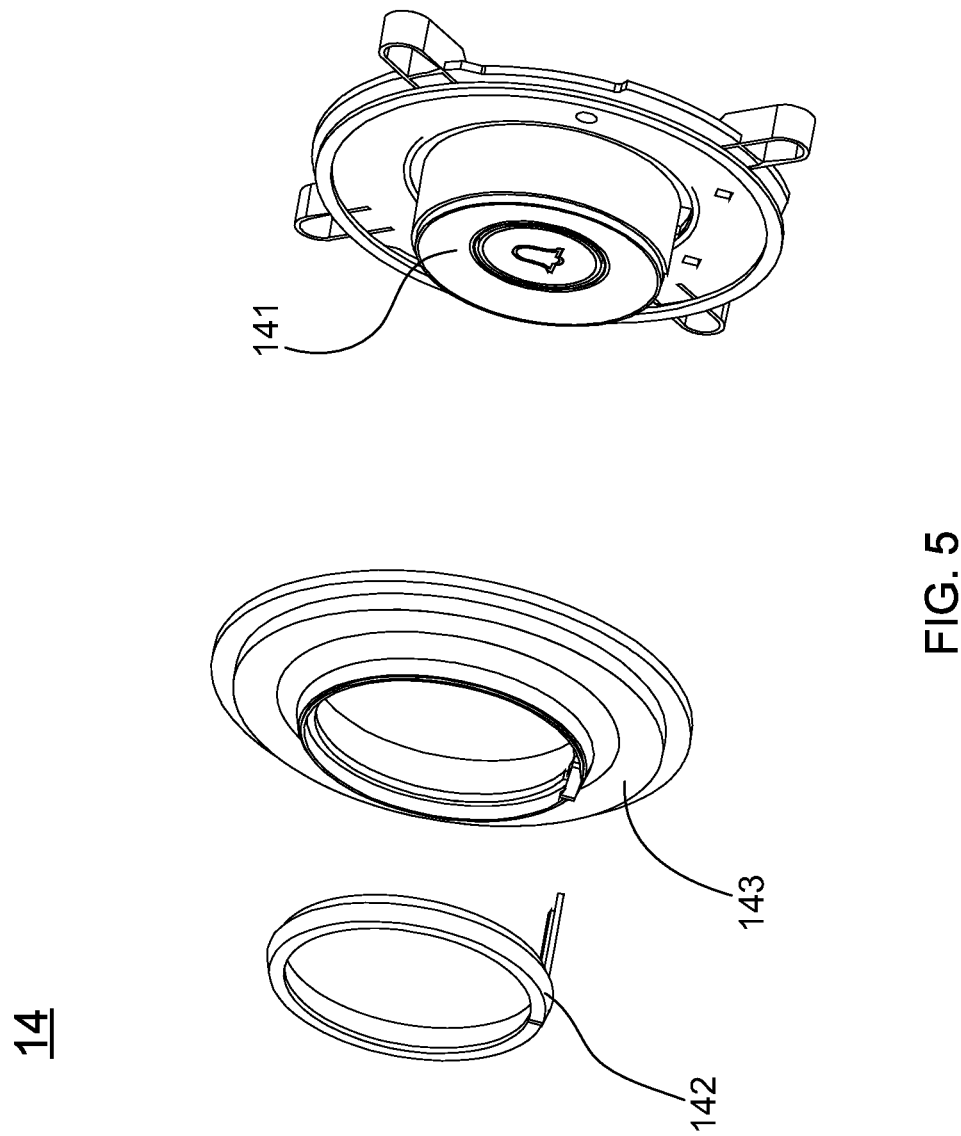
FIG. 5 is an exploded view of a doorbell module of the entrance guard device with light-uniformization structure according to the present invention.

Referring to FIG. 2 again, and please simultaneously refer to FIG. 5, which illustrates an exploded view of the doorbell module. Especially, in the entrance guard device 1 with light-uniformization structure of the present invention, the doorbell module 14 consists of a doorbell pressing member 141, a doorbell cover 143 and an induction antenna 142, wherein the doorbell cover 143 covers the doorbell pressing member 141 and makes a part of the doorbell pressing member 141 expose out of the doorbell cover 143, and the induction antenna 142 is disposed on the doorbell cover 143 by way of surrounding the doorbell cover 143. Therefore, the doorbell module 14 includes the functions of doorbell and card sensing by way of adding the induction antenna 142 into the doorbell module 14.

Thus, the above descriptions have been clearly and completely introduced the entrance guard device with light-uniformization structure of the present invention; in summary, the present invention has the following advantages:

1. In the present invention, a light-uniformization member is disposed in an image capture module and positioned at the front of a plurality of light-emitting chips, such that the light emitted by the light-emitting chips is able to enter the light-uniformization member, and then the light would be uniformly emitted by the light-uniformization member after the light are refracted; therefore, the uniform light may shine on people face for making an image capture device of the image capture module capture the facial feature of the people completely and clearly.
2. Moreover, in the present invention, there is coated a layer of white paint on the bottom portion of the image capture device accommodating body for reflecting the light emitted by the light-emitting chips, so as to make the light fully enter the light-uniformization member.
3. Inheriting to above point 1, because the uniform light is a soft light, the uniform light would not cause discomfort to people when the people's eyes is close to the uniform light.
4. Especially, in the present invention, the doorbell module includes the functions of doorbell and card sensing by way of adding the induction antenna into the doorbell module.

The above description is made on embodiments of the present invention. However, the embodiments are not intended to limit scope of the present invention, and all equivalent implementations or alterations within the spirit of the present invention still fall within the scope of the present invention.

We claim:

1. An entrance guard device with light-uniformization structure, comprising:
   a housing, having an accommodating case and a cover;
   a main controlling module, being accommodated in the accommodating case;
   a keypress module, being accommodated in the accommodating case and exposed out of the cover, and the keypress module being electrically connected to the main controlling module;
   a display module, being accommodated in the accommodating case and exposed out of the cover, and the display module being electrically connected to the main controlling module;
   a doorbell module, being accommodated in the accommodating case and exposed out of the cover, and the doorbell module being electrically connected to the main controlling module; and
   an image capture module, being accommodated in the accommodating case and exposed out of the cover, and the image capture module being electrically connected to the main controlling module, wherein the image capture module comprises:
   an image capture device accommodating body, having a bottom portion and a protrusion portion, wherein the bottom portion has a plurality of light-emitting device openings, and the protrusion portion having an image capture device opening and a sensing device opening;
   a light-emitting assembly, having a substrate, a plurality of light-emitting chips, a sensing device, and a light-emitting chip controller, wherein the substrate consists of a substrate aperture, and the light-emitting chips, the sensing device and the light-emitting chip controller being disposed on the substrate, moreover, the substrate being connected to the bottom portion of the image capture device accommodating body, such that the light-emitting chips respectively pass through the light-emitting device openings and the sensing device exposes out of the sensing device opening;
   an image capture device, being disposed into the protrusion portion of the image capture device accommodating body through the substrate aperture, and being exposed out of the image capture device opening of the protrusion portion;
   a light-uniformization member, being disposed on the image capture device accommodating body via a first gasket, and having a main aperture, a light-emitting surface and a light refracting surface opposite to the light-emitting surface; and
   a lens, being disposed over the main aperture for covering and protecting the image capture device;
   wherein the sensing device is able to sense the luminance brightness of an external environment, therefore, when the sensing device senses and determines that the luminance brightness of the external environment is not adequate for making the image capture device capture the facial feature of people completely and clearly, the sensing device informing the light-emitting chip controller for controlling the light-emitting chips to emit light;
   wherein when the light-emitting chips emit the light, the light would enter the light refracting surface of the light-uniformization member, and then the light being refracted by the light refracting surface, so as to be evenly emitted through the light-emitting surface of the light-uniformization member.

2. The entrance guard device with light-uniformization structure of claim 1, wherein the image capture module further comprises:
   a second gasket, being disposed on the light-emitting surface of the light-uniformization member by way of surrounding the light-emitting surface;
   a lens ringer, being disposed on the lens by way of surrounding the lens; and
   a microphone, being disposed on the light-uniformization member.

3. The entrance guard device with light-uniformization structure of claim 1, wherein the light refracting surface of the light-uniformization member comprises a plurality of light refracting portions.

4. The entrance guard device with light-uniformization structure of claim 3, wherein the shape of the light refracting portion is selected from the group consisting of: arc shape, trapezoid shape, square shape, triangle shape, and a combining shape by any two aforesaid shapes.

5. The entrance guard device with light-uniformization structure of claim 2, wherein the second gasket comprises a microphone receiving portion.

6. The entrance guard device with light-uniformization structure of claim 1, wherein the entrance guard device with light-uniformization structure can be disposed in a pre-buried box for being further embedded into a pre-dredged cave of a wall.

7. The entrance guard device with light-uniformization structure of claim 1, wherein the light-emitting chip is selected from the group consisting of: LED chip, OLED chip and bulb.

8. The entrance guard device with light-uniformization structure of claim 1, wherein the doorbell module further comprises:
- a doorbell pressing member;
- a doorbell cover, being covered the doorbell pressing member, and making a part of the doorbell pressing member expose out of the doorbell cover; and
- an induction antenna, being disposed on the doorbell cover by way of surrounding the doorbell cover.

9. The entrance guard device with light-uniformization structure of claim 1, wherein the bottom portion of the image capture device accommodating body is coated with a layer of white paint.

\* \* \* \* \*